US009621686B2

(12) United States Patent
Callis et al.

(10) Patent No.: US 9,621,686 B2
(45) Date of Patent: *Apr. 11, 2017

(54) IDENTIFYING RESET SOURCE AND REASON IN A TCP SESSION

(71) Applicant: International Business Machines Corporation, Armonk, NY (US)

(72) Inventors: Gregory M. Callis, Morrisville, NC (US); David A. Herr, RTP, NC (US); Mark W. McClintock, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,160

(22) Filed: Aug. 27, 2015

(65) Prior Publication Data

US 2016/0021195 A1    Jan. 21, 2016

Related U.S. Application Data

(63) Continuation of application No. 14/333,047, filed on Jul. 16, 2014.

(51) Int. Cl.
*H04L 29/06* (2006.01)
(52) U.S. Cl.
CPC .............. *H04L 69/22* (2013.01); *H04L 69/16* (2013.01)
(58) Field of Classification Search
CPC ........... H04L 1/18; H04L 29/06; H04W 72/04
See application file for complete search history.

(56) References Cited

U.S. PATENT DOCUMENTS

| 7,318,100 | B2 | 1/2008 | Demmer et al. |
| 7,660,980 | B2 | 2/2010 | Shay et al. |
| 8,001,594 | B2 | 8/2011 | Heintz et al. |
| 8,891,532 | B1* | 11/2014 | Smith ................... H04L 69/161 370/395.52 |
| 2010/0214919 | A1 | 8/2010 | Kosbab et al. |
| 2011/0058482 | A1* | 3/2011 | Nomura ............ H04L 29/12264 370/241 |

(Continued)

FOREIGN PATENT DOCUMENTS

EP    001379055 A1    1/2004

OTHER PUBLICATIONS

Arlitt et al., An Analysis of TCP Reset Behaviour on the Internet, acm, 2005.
Weaver et al; Detecting Forged TCP Reset Packets.

*Primary Examiner* — Ian N Moore
*Assistant Examiner* — Lakeram Jangbahadur
(74) *Attorney, Agent, or Firm* — Garg Law Firm, PLLC; Rakesh Garg; Christopher K. McLane

(57) ABSTRACT

A method for identifying reset source and reason in a TCP session is provided in the illustrative embodiments. A reset packet is prepared for the TCP session. An identifier associated with the target data processing system is added using a first header in the reset packet. The identifier associated with the target data processing system is unknown to a sender a data packet in the TCP session. The sender sends the data packet to another data processing system during the TCP session. A reason for resetting the TCP session is added using a second header in the reset packet. The TCP session is reset by sending the reset packet.

16 Claims, 8 Drawing Sheets

(56) References Cited

U.S. PATENT DOCUMENTS

2011/0093591 A1* 4/2011 Dalal ...................... H04L 1/187
                                                                    709/224
2012/0047572 A1* 2/2012 Duncan ............... H04L 63/0245
                                                                    726/13
2014/0095592 A1   4/2014 Hartrick et al.
2015/0222562 A1* 8/2015 Ashokan ................ H04L 47/27
                                                                    370/412

* cited by examiner

IDENTIFYING RESET SOURCE AND REASON IN A TCP SESSION

Present application is a CONTINUATION application of copending patent application Ser. No. 14/333,047, filed on Jul. 16, 2014, to which the present application claims priority.

TECHNICAL FIELD

The present invention relates generally to a method for managing a Transmission Control Protocol/Internet Protocol (TCP/IP) session. More particularly, the present invention relates to a method for identifying reset source and reason in a TCP session.

BACKGROUND

TCP is a commonly used communication protocol for communicating packet data from one data processing system to another over a data network. Establishing a TCP session (also called a TCP connection) between two data processing systems involves a multi-step exchange of preliminary information between the two systems. This multi-step exchange of information is called a three-way handshake.

A TCP session is terminated, or the TCP connection is broken when one of the two participating data processing systems sends a reset packet (TCP RST packet, RST packet) to the other participating data processing system. For example, if during the session, one data processing system fails to receive one or more acknowledgements from the other data processing system in the session, or the connection becomes unsynchronized for this or other reason, the data processing system sends a reset packet to the other data processing system. In some cases, a data processing system may receive a packet from another data processing system when the data processing system is not participating in a session with the other data processing system. The data processing system sends a reset packet to the other data processing system under such circumstances as well. There are many conditions, circumstances, or reasons, including but not limited to those described above, why one data processing system would sends a reset packet to another data processing system during TCP/IP communications.

SUMMARY

The illustrative embodiments provide a method for identifying reset source and reason in a TCP session. An embodiment includes a method for identifying a source and a reason of a reset in a Transmission Control Protocol (TCP) session. The embodiment prepares, at an application executing in a target data processing system, a reset packet for the TCP session. The embodiment adds, using a first header in the reset packet, an identifier associated with the target data processing system, wherein the identifier associated with the target data processing system is unknown to a sender a data packet in the TCP session, and wherein the sender sends the data packet to another data processing system during the TCP session. The embodiment adds, using a second header in the reset packet, a reason for resetting the TCP session. The embodiment resets the TCP session by sending the reset packet.

Another embodiment includes a computer usable program product comprising a computer readable storage device including computer usable code for identifying a source and a reason of a reset in a Transmission Control Protocol (TCP) session. The embodiment further includes computer usable code for preparing, at an application executing in a target data processing system, a reset packet for the TCP session. The embodiment further includes computer usable code for adding, using a first header in the reset packet, an identifier associated with the target data processing system, wherein the identifier associated with the target data processing system is unknown to a sender a data packet in the TCP session, and wherein the sender sends the data packet to another data processing system during the TCP session. The embodiment further includes computer usable code for adding, using a second header in the reset packet, a reason for resetting the TCP session. The embodiment further includes computer usable code for resetting the TCP session by sending the reset packet.

Another embodiment includes a data processing system for identifying a source and a reason of a reset in a Transmission Control Protocol (TCP) session. The embodiment further includes a storage device including a storage medium, wherein the storage device stores computer usable program code. The embodiment further includes a processor, wherein the processor executes the computer usable program code. The embodiment further includes computer usable code for preparing, at an application executing in a target data processing system, a reset packet for the TCP session. The embodiment further includes computer usable code for adding, using a first header in the reset packet, an identifier associated with the target data processing system, wherein the identifier associated with the target data processing system is unknown to a sender a data packet in the TCP session, and wherein the sender sends the data packet to another data processing system during the TCP session. The embodiment further includes computer usable code for adding, using a second header in the reset packet, a reason for resetting the TCP session. The embodiment further includes computer usable code for resetting the TCP session by sending the reset packet.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
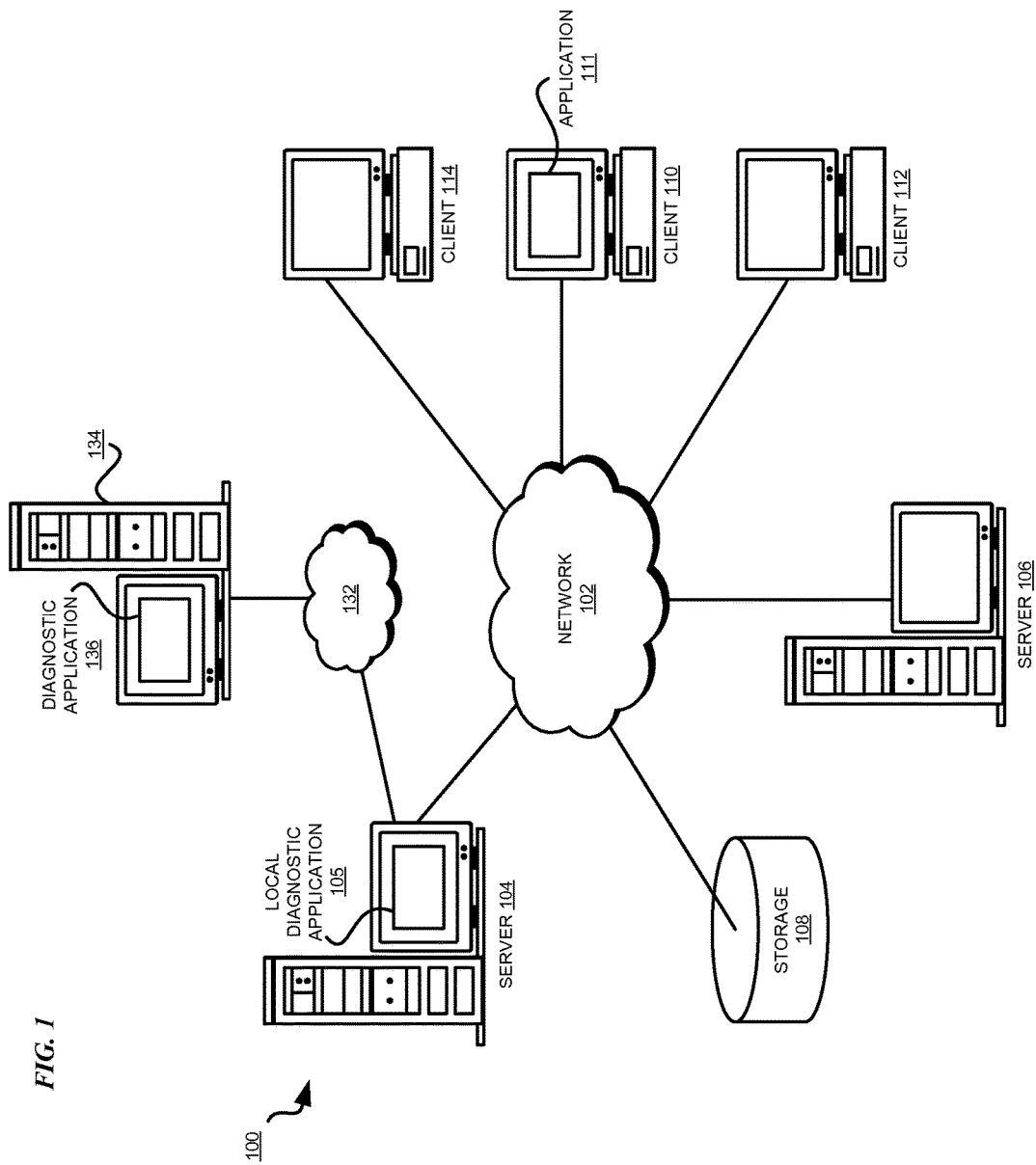
FIG. 1 depicts a block diagram of a network of data processing systems in which illustrative embodiments may be implemented.

Within the scope of the illustrative embodiments, a data processing system, node, logical partition, workload partition, virtual machine, or a TCP stack in these or another similarly purposed data processing configuration, which sends a data packet other than a reset packet in a TCP session is designated a "sender." The data packet may reach a "receiver" (also referred to as a "distributor" herein), which acts as a distributor of the data packets to other data processing systems. A final destination of the data packet is a "target". The receiver or distributor, and the target can each be a data processing system or node, logical partition, workload partition, virtual machine, or a TCP stack in these or other similarly purposed data processing configurations.

Any reference to a sender data processing system, target data processing system, distributor data processing system, or receiver data processing system is not intended to limit an illustrative embodiment to only a data processing system manifestation, but is similarly applicable to other configurations within the scope of the illustrative embodiments. Similarly, any reference to specific configurations, for example, a sender node or machine, target partition or virtual machine, distributor system or component, or receiver switch is not intended to limit an illustrative embodiment to only that specific configuration. An embodiment referencing a particular configuration in a particular role is similarly applicable to other possible configurations for similar roles within the scope of the illustrative embodiments.

A target data processing system may receive the data packet from a receiver or a sender, depending upon the configuration of the data network in which the data packet is being sent. The target terminates the session by transmitting a reset packet to the sender.

When a distributor is involved in a TCP connection, the sender does not always know the identity of the target. The illustrative embodiments recognize that when a sender receives a reset packet that breaks a TCP connection involving a distributor, diagnosing which target sent the reset packet, and for what reason becomes a tricky problem to solve.

The illustrative embodiments recognize that there is no provision in the TCP protocol for sending diagnostic information such as reason codes, error numbers, or other similarly purposed information in the reset packet. Because a target can send a reset for many reasons, it can be very difficult to diagnose why a reset was sent. This difficult diagnostics is further hindered by the needed but often unavailable access to the source code and internal diagnostics such as traces of the target that sent the reset.

The illustrative embodiments further recognize that not only is diagnosing the reason for the reset difficult, but also difficult is identifying the specific target node that sent the reset. In the original TCP protocol definition, each IP address was associated with a unique physical interface. The sender of the reset packet can be determined by examining the source IP address. If the source IP address has only been assigned to a single physical interface, it is easy to determine who sent the reset packet.

However, even with a source IP address, identifying the true sender of the reset packet is often a very difficult task. For example, Virtual IP Addresses (VIPAs) are not tied to any physical device or node, such as to a physical network card or port in a specific target data processing system. The source IP address of type VIPA can move from node to node (target to target) making it difficult to track the true source of a reset packet when a reset occurs in a TCP session using the VIPA.

The illustrative embodiments recognize that other factors contribute to the complexity of diagnosing reset occurrences in a TCP session. For example, Sysplex Distributor (SD) is a type of receiver or distributor data processing system and adds another layer of complexity to discovering the identity of the target that sent the reset packet. An SD uses a version of VIPAs called Distributed Dynamic Virtual IP addresses (DRVIPAs). Each target node of distributed workload activates the same DRVIPA address. When one of the target nodes builds a reset packet, the target node flips the source and destination IP Addresses. This flipping operation results in a reset packet with the DRVIPA as the source IP address, making it impossible to distinguish one target node from another target node, and to identify the specific target node from which the reset originated.

Normally when a node receives a packet, the node examines the destination IP address in the packet to determine whether that destination IP address is active locally on the node. If the destination IP address is active locally on the node, the packet is sent up the TCP/IP stack in that node to be processed further.

If the node does not have the destination IP address active locally on the node, the node tries to forward the packet. If the node cannot forward the packet, an ICMP message is sent back to the sender of the packet indicating that the target node at the destination IP address was unreachable. If the packet is sent up the local TCP/IP stack at the node but there is no target at the node for the TCP connection to which the packet belongs, the node sends a reset packet to the packet sender.

For example, in an implementation of DRVIPAs, the distributing stack is responsible for forwarding the data packet to the correct target stack. If the distributing stack were to forward the packet to an incorrect target—such as to an incorrect data processing system or node, logical partition, workload partition, virtual machine, or a TCP stack in these or similarly purposed data processing configuration—the incorrect target would send a reset packet to the sender of the data packet.

In addition to the ambiguity introduced by DRVIPAs, it is possible for a user—such as an administrator—to assign the same IP address to multiple nodes as duplicate IP addresses in a network through misconfiguration. The illustrative embodiments recognize that the misconfigured node could begin advertising the duplicate IP address and cause the local router to send packet to the wrong target node, resulting in a reset of a TCP session that should have been continued by another target in the network.

Thus, the illustrative embodiments recognize that to diagnose why a reset was being issued, the diagnostic process also has to know the identity of the system that issued the reset. The illustrative embodiments recognize that currently, the only way to determine the identity of the issuer of the reset is to execute sniffer traces at every potential issuer node. The illustrative embodiments recognize that presently, to determine why a reset was issued, without access to internal diagnostic information such as traces at several candidate targets, is extremely resource intensive and uncertain, if not impossible.

The illustrative embodiments used to describe the invention generally address and solve the above-described problems and other problems related to diagnosing resets in TCP sessions. The illustrative embodiments provide a method for identifying reset source and reason in a TCP session.

An embodiment implemented in a target data processing system determines that a reset packet should be sent to a sender data processing system. The embodiment configures the reset packet with information sufficient to identify the target data processing system, information sufficient to identify a reason for the reset, or both.

For example, one embodiment configures a first type of header in the reset packet, e.g., a Generic Routing Encapsulation (GRE) header for Internet Protocol version 4 (IPv4) or an extension header for Internet Protocol version 6 (IPv6), with information sufficient to identify the target data processing system, e.g., an IP address of the target data processing system. Another embodiment configures a second type of header in the reset packet, e.g., a TCP header or an option header, with information sufficient to identify the reason for the reset, e.g., a reset code from a published set of codes, a mutually agreed set of codes, a standard set of codes, or some combination thereof.

Another embodiment configures in the reset packet multiple headers of the same type, e.g., multiple option headers, where different instances of the headers include information sufficient to identify the target data processing system and information sufficient to identify the reason for the reset.

Another embodiment configures in the reset packet a single header of a suitable type, e.g., in an option header, in which information sufficient to identify the target data processing system and information sufficient to identify the reason for the reset are both stored separated by a delimiter.

Although the embodiments are described using one identifier of a target data processing system and one reason for the reset, such need not be interpreted as limiting on the illustrative embodiments. For example, sometimes, more than one type of identifying information can be helpful in accurately, speedily, or alternatively identifying the target system that sent the reset. In such cases, one or more headers can be employed to communicate the one or more corresponding target identifiers per header, with or without the use of delimiters as needed.

As another example, sometimes, more than one reason for the reset is applicable to a given situation under which the reset occurs. In such cases, one or more headers can be employed to communicate the one or more corresponding reset reason codes per header, with or without the use of delimiters as needed.

Any suitable target identifiers, including but not limited to IP addresses, are usable and contemplated in conjunction with an embodiment. Any suitable reason code, including but not limited to alphanumeric codes or description of the reasons, are usable and contemplated in conjunction with an embodiment.

A reset packet including additional information in accordance with an embodiment is referred to hereinafter as a detailed reset packet. An embodiment executing at a sender of a data packet enables determining at the sender whether the reset occurred using a standard reset packet according to TCP specification or by using a detailed reset packet according to an embodiment. When the sender receives a detailed reset packet, one embodiment at the sender notifies a user, such as an administrator, with the target identifier(s), reset reason code(s), or a combination thereof. Advantageously, using the information supplied in the notification from an embodiment, the user can then diagnose the session reset problem without needing the trace information to source code from the various potential targets.

When the sender receives a detailed reset packet, another embodiment at the sender begins a session with a receiver or distributor. The TCP session with the receiver or distributor is for diagnostic purposes. Once the session is established, the sender constructs a data packet to send to the receiver or distributor. The embodiment includes in the data packet the target identifier(s), reset reason code(s), or a combination thereof. A data packet including such information in accordance with an embodiment is referred to hereinafter as a detailed data packet. A detailed data packet can carry the target identifier(s), reset reason code(s), or a combination thereof, in a payload area of the packet, in one or more headers of the packet, or a combination thereof. Advantageously, using the information supplied in the detailed data packet from a sender-side embodiment, the receiver or distributor can then perform diagnostic operations without needing or using the trace information to source code from the various potential targets.

The illustrative embodiments are described with respect to certain roles, configurations, packets, protocols, headers, payload areas, codes, identifiers, rules, policies, algorithms, data processing systems, environments, components, and applications only as examples. Any specific manifestations of such artifacts are not intended to be limiting to the invention. Any suitable manifestation of data processing systems, environments, components, and applications can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
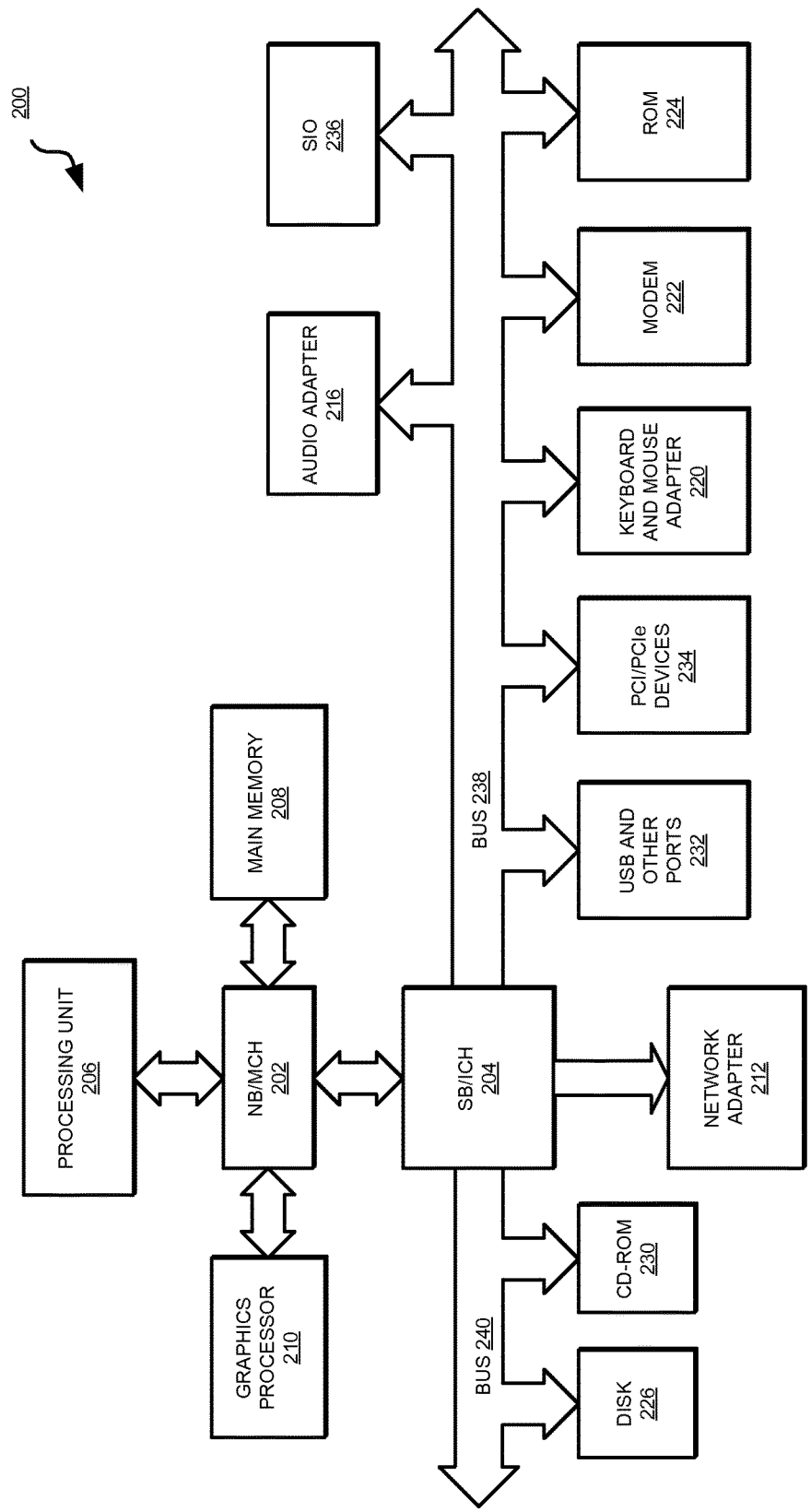
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments.

Data processing system 134 or a configuration therein operates as a sender of a data packet over data network 132 to data processing system 104. Data processing system 104 or a configuration therein operates as a receiver or a distributor. Data network 132 operates in a manner similar to network 102. In one example, network 132 is a wide area network (WAN) and network 102 is a local area network (LAN). In another embodiment, network 132 is a part of network 102. Client 110 or a configuration therein operates as a target. Application 111 in target 110 implements one or more embodiments described herein. For example, application 111 constructs a detailed reset packet according to one or more embodiments and sends the detailed reset packet to sender 134. Diagnostic application 136 executes one or more sender-side embodiments described herein. For example, diagnostic application 136 notifies a user, initiates a diagnostic session with receiver or distributor 104, sends a detailed data packet according to an embodiment to receiver or distributor 104, or a combination thereof. Receiver or distributor 104 executes local diagnostic application 105, which implements an embodiment to diagnose reset problems using the detailed data packet received from diagnostic application 136 in sender 134.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments. Data processing system 200 is also representative of a data processing system or a configuration therein, such as sender 134 in FIG. 1 in which computer usable program code or instructions implementing the processes of the illustrative embodiments may be located. Data processing system 200 is described as a computer only as an example, without being limited thereto. Implementations in the form of sender 134, receiver or distributor 104, and target 110 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 111, diagnostic application 136, or local diagnostic application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
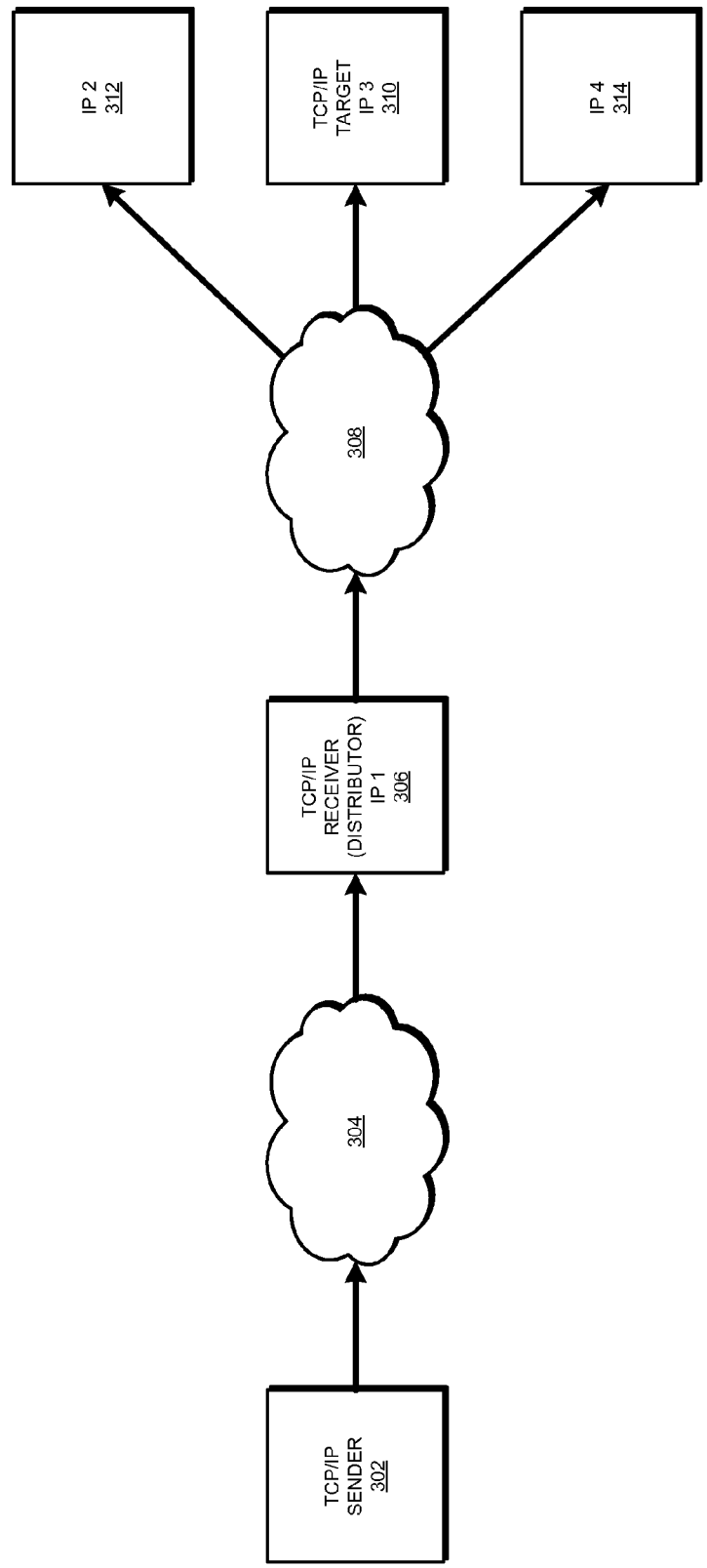
FIG. 3 depicts a block diagram of an example configuration for identifying reset source and reason in a TCP session in accordance with an illustrative embodiment.

With reference to FIG. 3, this figure depicts a block diagram of an example configuration for identifying reset source and reason in a TCP session in accordance with an illustrative embodiment. Sender 302 is an example of sender 134 in FIG. 1, network 304 is an example of network 132 in FIG. 1, receiver or distributor 306 is an example of receiver or distributor 104 in FIG. 1, network 308 is an example of network 102 in FIG. 1, and target 310 is an example of target 110 in FIG. 1.

Assume that distributor 306 has an identifier, e.g., an IP address "IP 1" associated therewith. Similarly, target 310 has an identifier, e.g., an IP address "IP 3", target 312 has an identifier, e.g., an IP address "IP 2" associated therewith, and target 314 has an identifier, e.g., an IP address "IP 4" associated therewith, respectively. Distributor 306 receives packets from sender 302 and other senders, and distributes those packets to some combination of locally in distributor 306, target 310, other target 312, and other target 314.

Only as an example, under one example circumstance, assume that other target 312 is engaged in a TCP session with sender 302. For some reason, distributor 306 sends a data packet from sender 302 to target 310. Target 310 determines that a reset has to be sent to sender 302. Target 310 includes an embodiment described herein, such as by including application 111 of FIG. 1. Accordingly, target 310 prepares and sends a detailed reset packet to sender 302. In one embodiment, the detailed reset packet is communicated from target 310 to sender 302 without the involvement of distributor 306.

As another example, under another example circumstance assume that other target 310 is engaged in a TCP session with sender 302. For some reason, the session becomes desynchronized and target 310 determines that a reset has to be sent to sender 302. Target 310 includes an embodiment described herein, such as by including application 111 of FIG. 1. Accordingly, target 310 prepares and sends a detailed reset packet to sender 302. In one embodiment, the detailed reset packet is communicated from target 310 to sender 302 without the involvement of distributor 306.

In one embodiment, target 310 is configured such that target 310 can selectively send a standard reset packet or a detailed reset packet to sender 302. When diagnostic activity is expected or configured in a data processing environment, target 310 sends the detailed reset packets, otherwise target 310 sends the standard reset packets.

Figure 4A:
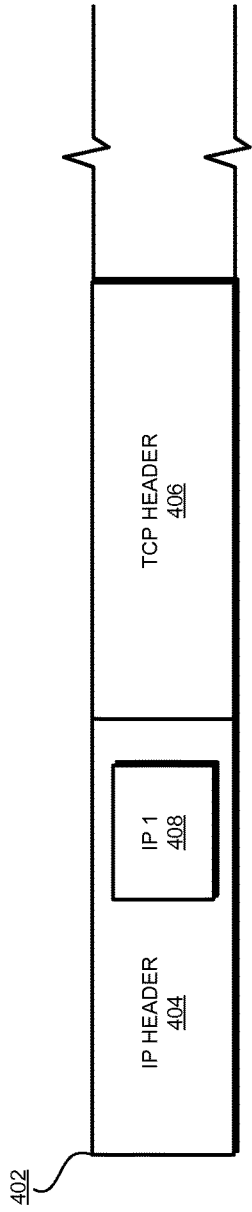
FIG. 4A depicts a portion of a standard reset packet that can be improved for diagnosing the causes of session reset in accordance with an illustrative embodiment.

With reference to FIG. 4A, this figure depicts a portion of a standard reset packet that can be improved for diagnosing the causes of session reset in accordance with an illustrative embodiment. Standard reset packet 402 includes IP header 404 and TCP header 406. IP header 404 includes the IP address of the source of the reset packet. However, as described elsewhere, in a session involving a distributor, such as distributor 306 of FIG. 3, where the distributor is the sender/forwarder from the target's perspective, the target places the distributor's IP address in IP header 404. According to the example configuration of FIG. 3 where this scenario applies, that IP address is "IP 1", which belongs to distributor 306 in FIG. 3. Accordingly, the target includes "IP 1" in source IP address field 408 in IP header 404 of standard reset packet 402.

Figure 4B:
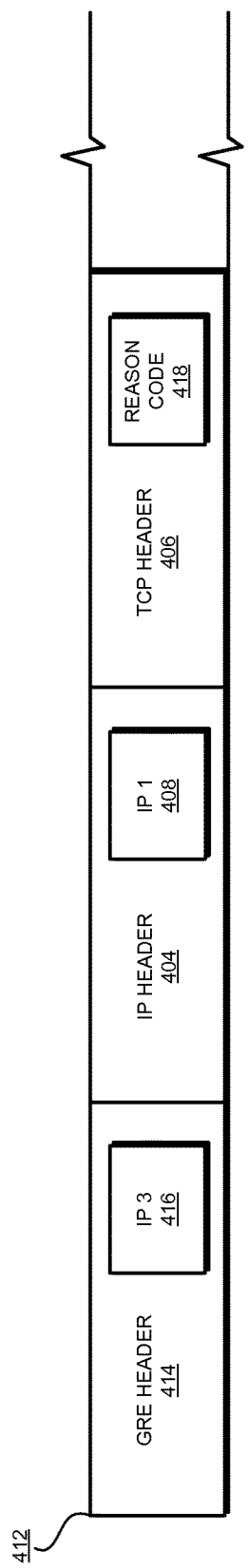
FIG. 4B depicts a portion of an example detailed reset packet in accordance with an illustrative embodiment.

With reference to FIG. 4B, this figure depicts a portion of an example detailed reset packet in accordance with an illustrative embodiment. Detailed reset packet 412 includes IP header 404 and TCP header 406 as in standard reset packet 402 in FIG. 4A. IP header 404 includes the IP address of the source of the reset packet according to the TCP/IP standard specification. Accordingly, the target includes "IP 1" in source IP address field 408 in IP header 404 in detailed reset packet 412 as well.

In accordance with an embodiment, such as an embodiment implemented in application 111 in FIG. 1, detailed reset packet 412 further includes header 414, which as an example is a GRE header for IPv4 or an extension header for IPv6. The application adds the identifier associated with the target that is resetting the session in field 416 in header 414. Accordingly, the application includes "IP 3" in field 416.

In accordance with an embodiment, such as an embodiment implemented in application 111 in FIG. 1, detailed reset packet 412 further adds a code, text, or other information to describe why the target is resetting the session. The application adds such reason code or information in field 418 in TCP header 406.

Figure 4C:
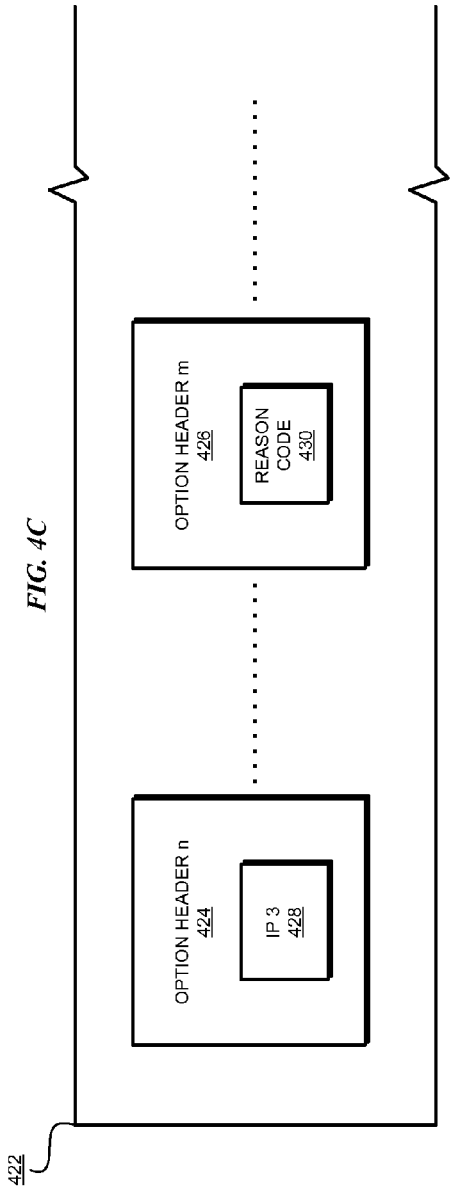
FIG. 4C depicts a portion of another example detailed reset packet in accordance with an illustrative embodiment.

With reference to FIG. 4C, this figure depicts a portion of another example detailed reset packet in accordance with an illustrative embodiment. Detailed reset packet 422 includes any number of option headers, including option headers 424 and 426. Operating in the manner similar to the manner described with respect to FIG. 4B, another embodiment, such as an embodiment implemented in application 111 in FIG. 1, adds the identifier associated with the target that is resetting the session in field 428 in option header 424. Accordingly, the application includes "IP 3" in field 428.

In accordance with an embodiment, such as an embodiment implemented in application 111 in FIG. 1, detailed reset packet 422 further adds a code, text, or other information to describe why the target is resetting the session. The application adds such reason code or information in field 430 in option header 426.

Figure 4D:
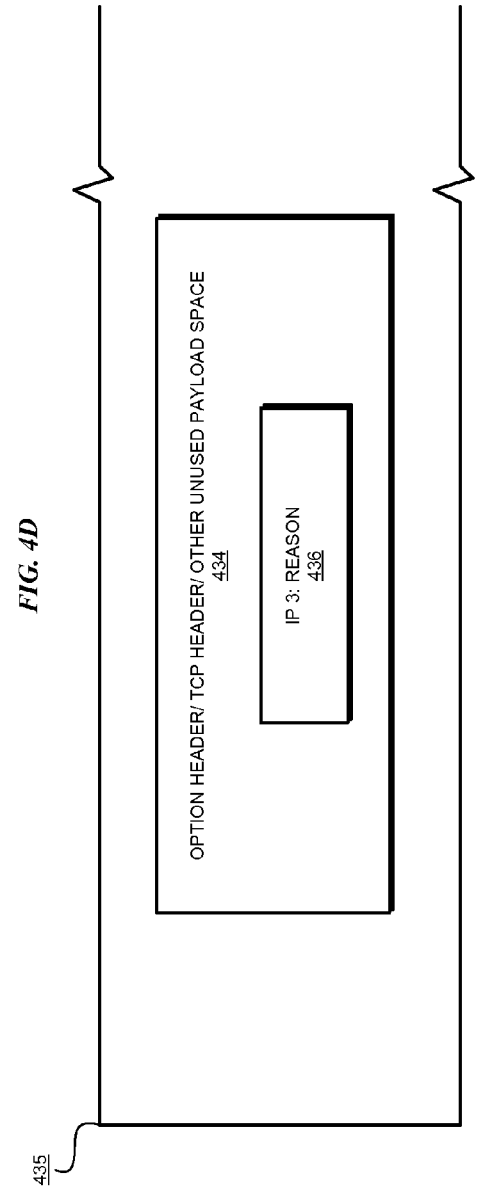
FIG. 4D depicts a portion of another example detailed reset packet in accordance with an illustrative embodiment.

With reference to FIG. 4D, this figure depicts a portion of another example detailed reset packet in accordance with an illustrative embodiment. Detailed reset packet 432 includes space 434. Space 434 may comprise any type of header, such as an option header, any structure usable for encapsulation or tunneling such as a GRE header for IPv4 or an extension header for IPv6, TCP header, IP header, or other header, or unused space elsewhere, such as in a payload area of a packet.

Operating in the manner similar to the manner described with respect to FIG. 4C, another embodiment, such as an embodiment implemented in application 111 in FIG. 1, adds the identifier associated with the target that is resetting the session, and a code, text, or other information to describe why the target is resetting the session in field 436 in space 434. Field 436 may be all or part of space 434.

According to one embodiment, the application separates the target identifier from the reason code using a delimiter. In the depicted example, the delimiter is the colon character ":". Generally, the delimiter can be any suitable character, string, or pattern. For example, the delimiter can be, but need not be limited to, a mutually agreed upon character or pattern, a character or pattern not used for any specific purpose, a non-standard character or pattern.

According to another embodiment, the application separates the target identifier from the reason code using strict spacing (not shown). Strict spacing only allows placing certain information in certain positions in space 434, e.g., the target identifier begins at bit 24 (or another specific position) in space 434 and the reason code begins at bit 41 (or another specific position) in space 434.

Figure 5:
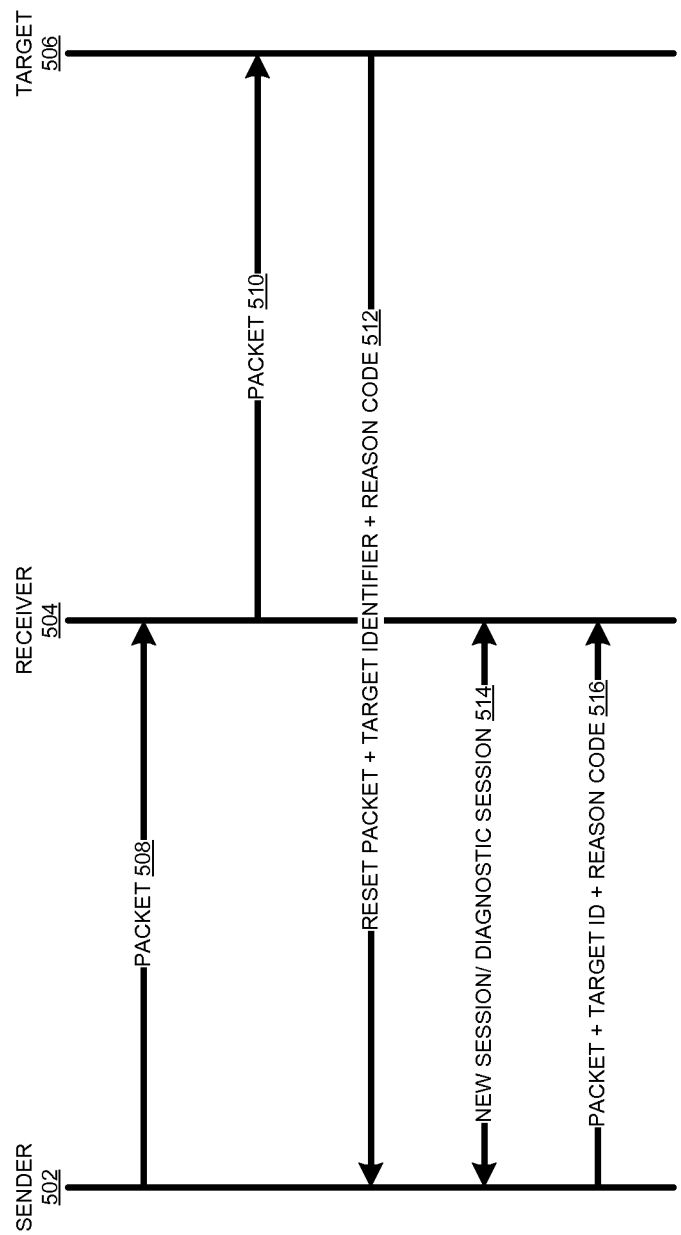
FIG. 5 depicts a timing diagram of an example flow of information for diagnosing a TCP session reset in accordance with an illustrative embodiment.

With reference to FIG. 5, this figure depicts a timing diagram of an example flow of information for diagnosing a TCP session reset in accordance with an illustrative embodiment. Sender 502 is an example of sender 302 in FIG. 3. Receiver 504 is an example of receiver or distributor 306 in FIG. 3. Target 506 is an example of target 310 in FIG. 3.

Sender 502 sends data packet 508 to receiver 504. Receiver 504 forwards packet 510 to target 506. Target 506 sends detailed reset packet 512 to sender 502. Detailed reset packet 512 includes the information of a standard reset packet, a target identifier, and a reason code for the reset. The session in which packet 508 was sent terminates.

Sender 502 initiates a new session with receiver 504, such as via new 3-way handshake 514. Sender 502 sends packet 516 to receiver 504. Packet 514 includes the target identifier and the reason code received in detailed reset packet 512. Sender 502 or receiver 504 may terminate the new session thereafter. Receiver 504 proceeds to diagnose the reset of the session in which packet 508 was sent using the information contained in packet 516.

Figure 6:
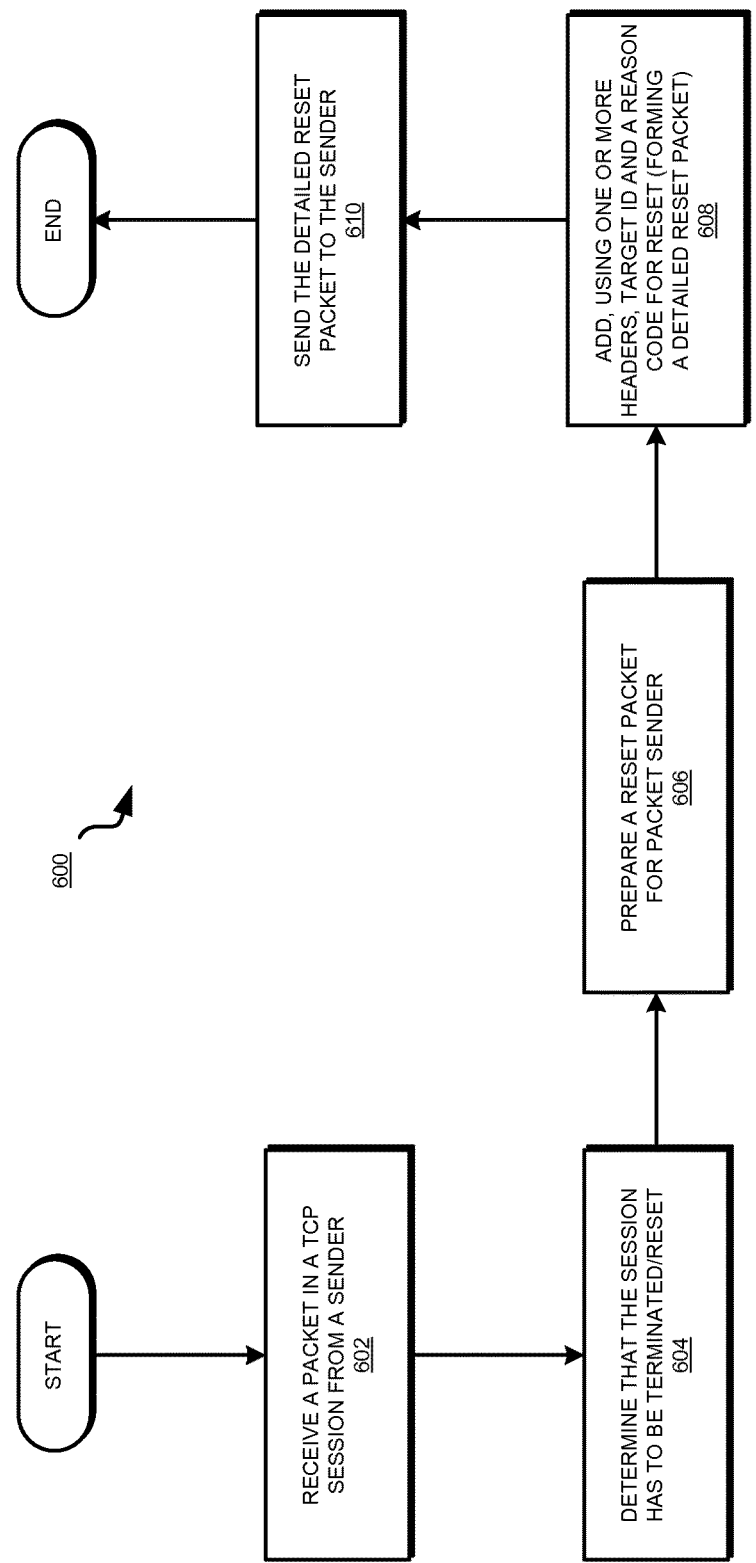
FIG. 6 depicts a flowchart of an example process for identifying reset source and reason in a TCP session in accordance with an illustrative embodiment.

With reference to FIG. 6, this figure depicts a flowchart of an example process for identifying reset source and reason in a TCP session in accordance with an illustrative embodiment. Process 600 can be implemented in application 111 in FIG. 1.

The application receives a packet in a TCP session from a sender, such as packet 508 in FIG. 5 (block 602). Note that in some cases, block 602 may be omitted or may not occur, and the application may decide to reset a session for other reasons without receiving the packet of block 602 and proceeding directly o block 604.

The application determines that the session has to be terminated or reset (block 604). The application prepares a reset packet for the sender (block 606). The application adds using one or more headers or other spaces in the reset packet, the identifier of the target that is resetting the session, and a reason code or information (block 608). The application thus forms a detailed reset packet in block 608.

The application sends the detailed reset packet to the sender (block 610). The application ends process 600 thereafter.

Figure 7:
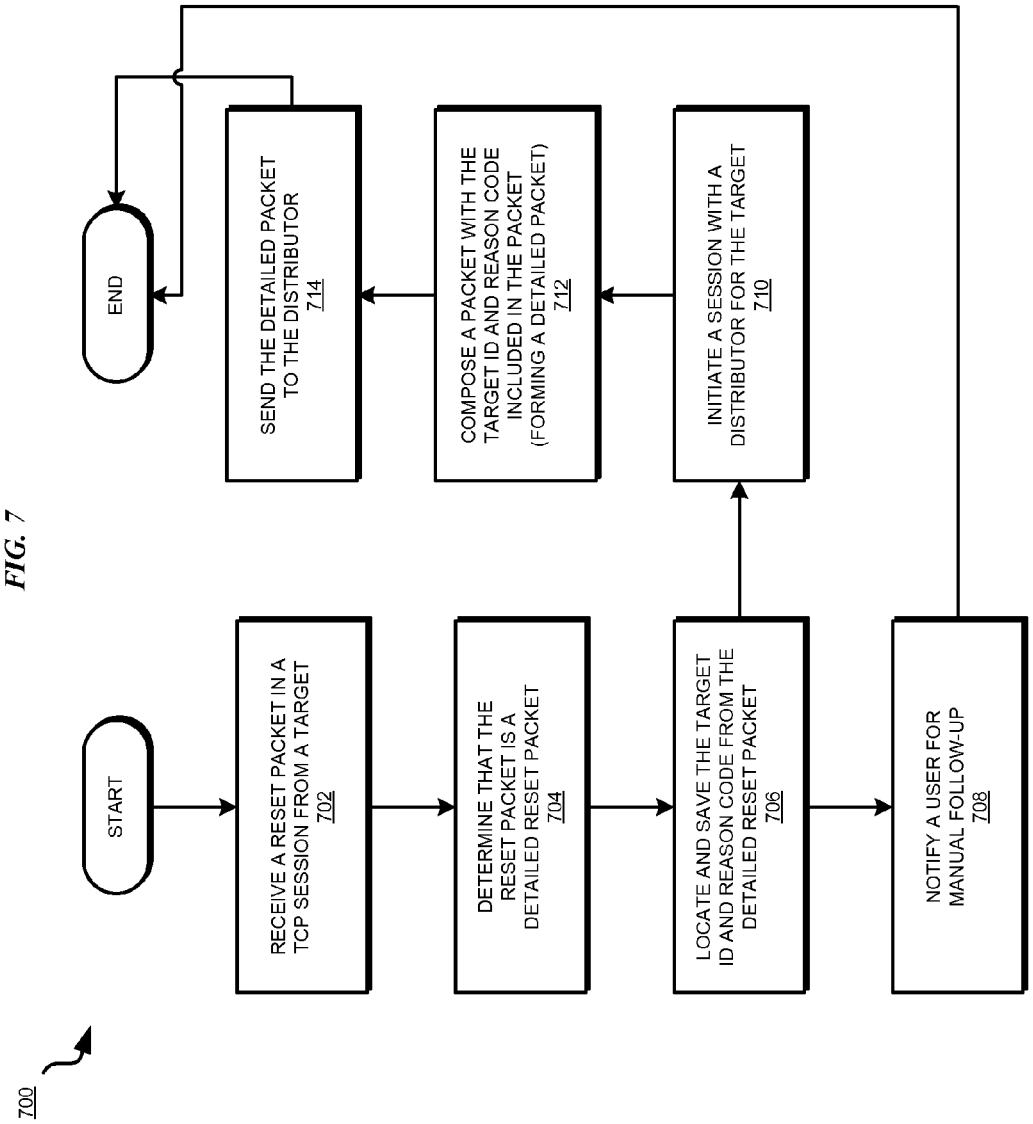
FIG. 7 depicts a flowchart of another example process for diagnosing a session reset in accordance with an illustrative embodiment.

With reference to FIG. 7, this figure depicts a flowchart of another example process for diagnosing a session reset in accordance with an illustrative embodiment. Process 700 can be implemented in diagnostic application 136 in FIG. 1.

The diagnostic application receives a reset packet in a TCP session from a target (block 702). The diagnostic application determines that the reset packet is a detailed reset packet (block 704).

The diagnostic application locates and saves the target identifier and the reason code or information from the detailed reset packet (block 706). The diagnostic application then takes one or both of two branches of process 700.

In one branch of process 700, the diagnostic application notifies a user with the saved target identifier and reason code from block 707 (block 708). The application ends process 700 thereafter. The user is thus enabled by the diagnostic application to perform a manual follow-up and diagnostic operation on the session reset of process 600.

In another branch of process 700, the diagnostic application initiates a session with a distributor for the target (block 710). The diagnostic application composes a packet, the packet including the saved target identifier and the reason code or information from block 706 (block 712). The diagnostic application thus forms a detailed packet according to an embodiment.

The diagnostic application sends the detailed packet to the distributor (block 714). The application ends process 700 thereafter. The distributor is thus enabled by the diagnostic application to perform a diagnostic operation on the session reset of process 600.

Thus, a computer implemented method is provided in the illustrative embodiments for identifying reset source and reason in a TCP session.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for identifying a source and a reason of a reset in a Transmission Control Protocol (TCP) session, the method comprising:
    preparing, at an application executing in a target data processing system, a reset packet for the TCP session;
    adding, by the application at the target data processing system, using a first header in the reset packet, an identifier associated with the target data processing system, wherein the identifier associated with the target data processing system is unknown to a sender data processing system of a data packet in the TCP session, and wherein the TCP session is established between the sender data processing system and a receiver data processing system, wherein the target data processing system is not a part of the TCP session, and the sender sends the data packet to the receiver data processing system during the TCP session;
    adding, responsive to the data packet reaching the target data processing system instead of the receiver data processing system, by the application at the target data processing system, using a second header in the reset packet, a reason for resetting the TCP session; and
    resetting, by the application at the target data processing system, the TCP session by sending the reset packet from the target data processing system to the sender data processing system.

2. The method of claim 1, wherein the other data processing system comprises a distributor data processing system, wherein the target data processing system receives the data packet from the distributor data processing system, further comprising:
    populating a location in the reset packet with an identifier that is associated with a distributor, the location being specified in a TCP specification for the reset packet.

3. The method of claim 1, further comprising:
    receiving the data packet from the sender during the TCP session; determining that the TCP session has to be reset.

4. The method of claim 1, wherein the first header is the second header, further comprising:
    separating the identifier associated with the target data processing system from the reason, wherein the separating uses a delimiter between the target data processing system and the reason.

5. The method of claim 1, wherein the first header is the second header, further comprising:
    separating the identifier associated with the target data processing system from the reason, wherein the separating places the target data processing system at a first designated position in the reset packet and places the reason at a second designated position in the reset packet.

6. The method of claim 1, wherein the second header is an area of a payload space in the reset packet.

7. The method of claim 1, wherein the second header comprises an option header.

8. The method of claim 1, wherein the second header comprises a TCP header.

9. The method of claim 1, wherein the second header comprises one of (i) a Generic Routing Encapsulation (GRE) header for Internet Protocol version 4 (IPv4), and (ii) an extension header for Internet Protocol version 6 (IPv6).

10. The method of claim 1, wherein the reason comprises an alphanumeric code.

11. The method of claim 1, wherein the reason comprises a descriptive text.

12. The method of claim 1, wherein the first header is an unused space in the reset packet.

13. The method of claim 1, wherein the first header comprises one of (i) a Generic Routing Encapsulation (GRE) header for Internet Protocol version 4 (IPv4), and (ii) an extension header for Internet Protocol version 6 (IPv6).

14. The method of claim 1, wherein the first header comprises a TCP header.

15. The method of claim 1, wherein the first header comprises an option header.

16. The method of claim 1, wherein the first header is an area of a payload space in the reset packet.

* * * * *